(12) United States Patent
Bobby et al.

(10) Patent No.: US 7,575,285 B2
(45) Date of Patent: Aug. 18, 2009

(54) LOCKING MECHANISM FOR VALVE HANDLE

(75) Inventors: Brian Bobby, North Ridgeville, OH (US); Travis G. Ramler, Elyria, OH (US); Richard Conklin, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 382 days.

(21) Appl. No.: 11/119,108

(22) Filed: Apr. 29, 2005

(65) Prior Publication Data
US 2006/0244306 A1 Nov. 2, 2006

(51) Int. Cl.
*B60T 8/34* (2006.01)
(52) U.S. Cl. .................... 303/118.1; 303/56; 303/40
(58) Field of Classification Search ............. 303/89, 303/118.1, 56, 40; 251/99, 243; 74/54
See application file for complete search history.

(56) References Cited

U.S. PATENT DOCUMENTS

| | | | | |
|---|---|---|---|---|
| 3,630,234 | A | * | 12/1971 | Hoffman ............... 137/630.2 |
| 3,790,229 | A | * | 2/1974 | Brown ..................... 303/52 |
| 4,161,341 | A | * | 7/1979 | Reinecke et al. .......... 303/52 |
| 5,439,276 | A | * | 8/1995 | Jerina et al. ............... 303/56 |
| 6,032,922 | A | * | 3/2000 | Shew ...................... 251/99 |

FOREIGN PATENT DOCUMENTS

| | | |
|---|---|---|
| DE | 2953606 | 5/1981 |
| DE | 152816 A2 * | 8/1985 |
| EP | 068 723 | 1/1983 |
| EP | 532 424 | 3/1993 |
| GB | 257145 A1 * | 3/1988 |
| GB | 229795 | 10/1990 |

OTHER PUBLICATIONS

International Search Report and Written Opinion from PCT/US06/010653.
Bendix Service Data Sheet, SD-03-824, Bendix TC-7 Trailer Control Brake Valve, Mar. 2004, 4 pgs.
Bendix Service Data Sheet, SD-03-821, Bendix TC-6 Trailer Control Brake Valve, Mar. 2004, 4 pgs.

* cited by examiner

*Primary Examiner*—Robert A Siconolfi
*Assistant Examiner*—Mariano Sy
(74) *Attorney, Agent, or Firm*—Calfee, Halter & Griswold LLP

(57) ABSTRACT

A locking control valve is provided. This control valve includes a valve body that further includes a first locking member, and a handle attached to the valve body. The handle is moveable between a first position and a second position for controlling the operation of the valve and further includes a second locking member. The first locking member and the second locking member cooperate with one another to retain the handle in the second position when so desired by the operator of the vehicle.

14 Claims, 5 Drawing Sheets

LOCKING MECHANISM FOR VALVE HANDLE

BACKGROUND OF THE INVENTION

This invention relates in general to valves for use in vehicle brake systems that utilize pressurized air, and in particular to a control valve for controlling the flow of pressurized air to the brakes of a vehicle.

Large commercial combination vehicles having a tractor portion and a trailer portion often include a vehicle braking system that utilizes compressed air. Air brake systems usually include a combination of three different braking systems: the service brakes, the parking brakes, and the emergency brakes. The service brake system applies and releases the brakes when the driver uses the brake pedal during normal driving situations. The parking brake system applies and releases the parking brakes when the parking brake control is engaged. The emergency brake system utilizes portions of the service brake and parking brake systems to stop the vehicle in the event of a brake system failure. Some air brake systems include a control brake valve that allows the operator to manually control the services brakes on the trailer portion of the vehicle independently of the tractor brakes. Such control valves are particularly useful in situations where a manually-controlled pressure graduation function is desired.

Control valves that are used for providing manually-controlled pressure gradation typically include a valve body that is attached to a handle which is used to operate or control the function of the valve. A spring or other biasing member may be incorporated into the valve to provide mechanical force for holding or retaining the valve handle in a first or closed position. Manually moving the handle from the first position to a second position typically causes the valve to change from a closed state to an open state. The valve will remain in the open state as long as the handle is held in the second position by the operator of the vehicle and will return to the closed state only when the handle is released. Continually holding the handle in the second or open position is often inconvenient and/or impractical for the operator; thus, there is a need for a locking mechanism that retains or holds the handle, and consequently the valve, in the second or open position and that does not involve continuous physical effort on the part of the vehicle's operator.

SUMMARY OF THE INVENTION

Deficiencies in and of the prior art are overcome by the present invention, the exemplary embodiment of which provides a handle locking mechanism for a control valve used with an air brake system or other system. In accordance with one aspect of the present invention, an air brake system is provided. This system includes: at least one source of pressurized air; at least one locking control valve in communication with the source of pressurized air; and at least one brake in communication with the control valve. In accordance with another aspect of the present invention, a locking control valve for use with air brake systems is provided. This control valve includes: a valve body that further includes a first locking member; and a handle attached to the valve body. The handle is moveable between a first position and a second position for controlling the operation of the valve and further includes a second locking member. The first locking member and the second locking member cooperate with one another to retain the handle in the second position when so desired. In accordance with yet another aspect of the present invention, a method for controlling the operation of a valve is provided. This method includes: manufacturing a valve body that includes a first locking member; attaching a handle to the valve body, wherein the handle includes a second locking member and is moveable between a first position and a second position for controlling the operation of the valve; attaching a biasing member to the handle, wherein the biasing member provides mechanical force for retaining the handle in the first position; and moving the handle from the first position to the second position thereby allowing the first locking member and the second locking member to engage one another and overcome the force of the biasing member to retain the handle in the second position when so desired.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the embodiments given below, serve to explain the principles of the invention.

DETAILED DESCRIPTION OF THE INVENTION

This invention relates to a handle locking mechanism for a control valve used with an air brake system. One embodiment of this invention provides an air brake system for use in a vehicle. This system includes: at least one source of pressurized air; at least one locking control valve in communication with the source of pressurized air; and at least one brake in communication with the control valve. Another embodiment of this invention provides a locking control valve for use with air brake systems. This control valve includes: a valve body that further includes a first locking member; and a handle attached to the valve body. The handle is moveable between a first position and a second position for controlling the operation of the valve and further includes a second locking member. The first locking member and the second locking member cooperate with one another to retain the handle in the second position. Still another embodiment of this invention provides a method for controlling the operation of a valve. This method includes: manufacturing a valve body that includes a first locking member; attaching a handle to the valve body, wherein the handle includes a second locking member and is moveable between a first position and a second position for controlling the operation of the valve; attaching a biasing member to the handle, wherein the biasing member provides mechanical force for retaining the handle in the first position; and moving the handle from the first position to the second position thereby causing the first locking member and the second locking member to engage one another and overcome the force of the biasing member and retain the handle in the second position when the vehicle's operator so desires. The various components of this invention are typically manufactured using known manufacturing methods and techniques.

Figure 1:
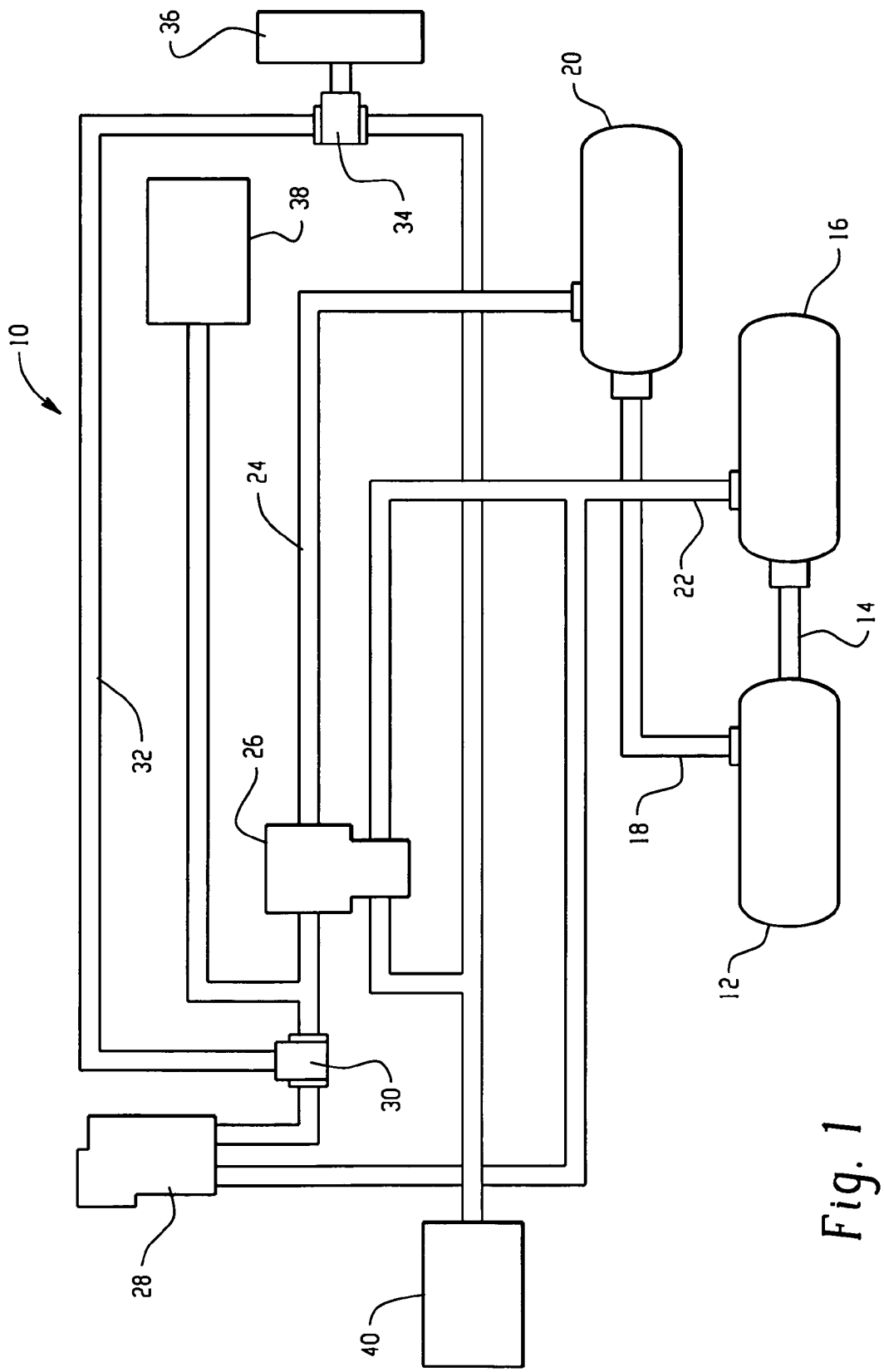
FIG. 1 is schematic diagram of an exemplary air brake system that includes the control valve of the present invention.

With reference now to the Figures, FIG. 1 provides a simplified schematic diagram of an exemplary air brake system that 10 includes the control valve of the present invention. In this system, supply reservoir 12 is connected by line 14 to front brake reservoir 16 and by line 18 to rear brake reservoir 20. Lines 22 and 24 connect reservoirs 16 and 20 respectively to foot valve 26. Line 22 also connects reservoir 16 to control valve 28 and line 24 connects foot valve 26 to control valve 28 through double check valve 30. Line 24 also connects foot valve 26 to rear brakes 38. Line 32 connects double check valve 30 to a second double check valve 34, which is in communication with tractor protection valve 36. Line 32 also connects double check valve 34 to foot valve 26 and to front brakes 40.

As shown in FIGS. 2-5, an exemplary embodiment of control valve 100 includes a handle 110, a first or "upper" body portion 120, and a detachable second or "lower" body portion 130. In some embodiments of this invention, handle 110 is attached to an integrated or unified valve body that does not include separate upper and lower portions. In the embodiment shown in the Figures, upper body portion 120 includes a handle receiving portion 122, a plurality of surface mounts 124 for receiving the bolts used to mount control valve 100 to a surface within the vehicle's cab, a plurality of cover mounts 125 for receiving a cover that snaps over upper body portion 120, a base 126 that includes two bores or internal passages 127 for receiving connecting means 160 (i.e., groove pins), which cooperate with collar or flange 130 hand groove 133 to connect upper body portion 120 to lower body portion 130.

Figure 2:
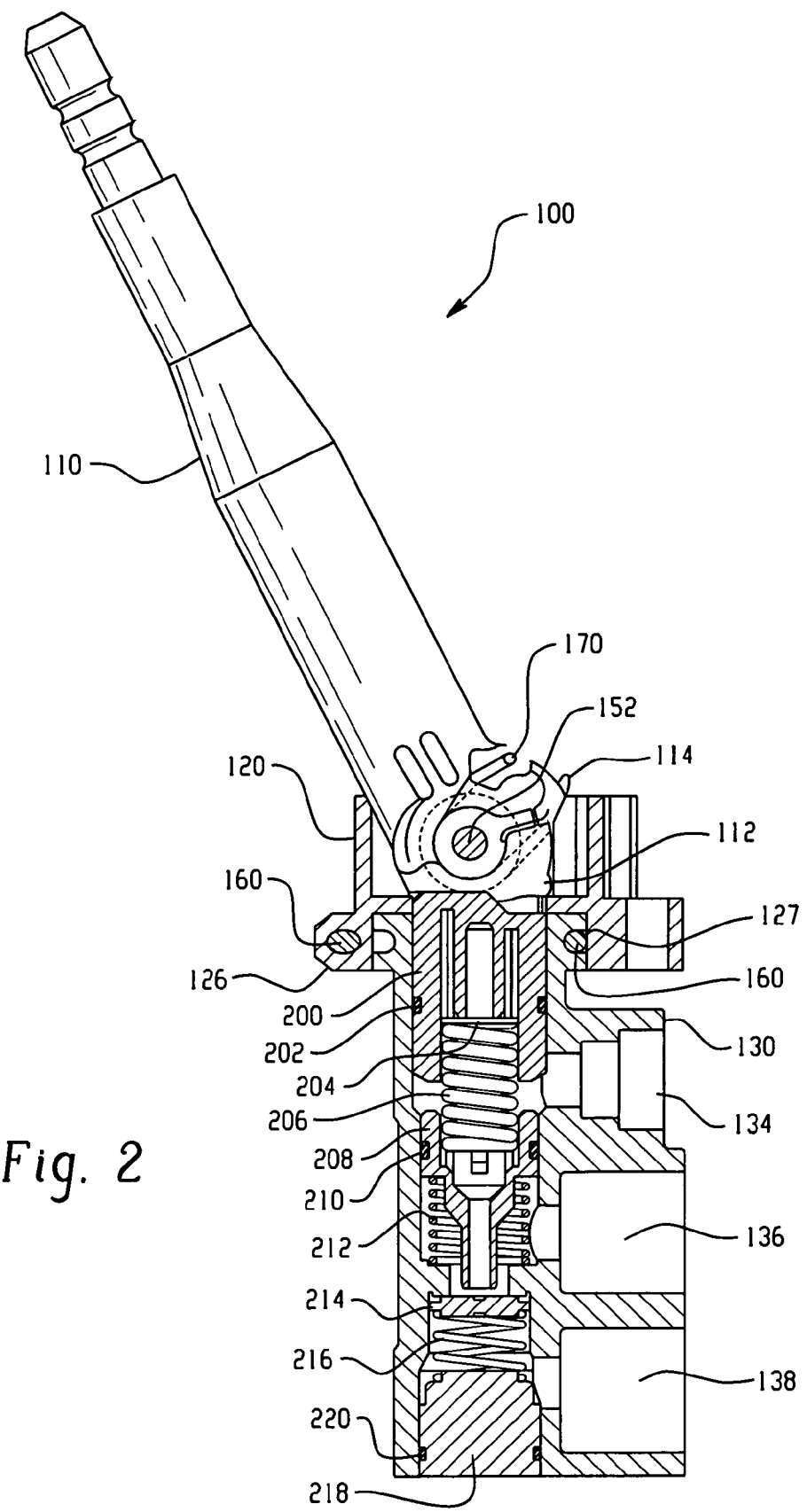
FIG. 2 is cross-sectional side view of the valve handle and body configuration of the present invention.

As best shown in FIG. 2, lower body portion 130 includes a plurality of ports for connecting the valve to pneumatic lines as well as a number of internal structures that allow the valve to function for its intended purpose. The plurality of ports provided on the exemplary embodiment of lower body portion 130 includes exhaust port 134, delivery port 136, and supply port 138. A plurality of ribs 140 may be formed on the exterior of lower body portion 130. The internal structure of the exemplary embodiment includes: cam follower 200, a first o-ring 202 for forming a seal between the interior of body portion 130 and cam follower 200, washer 204 which sits atop graduating spring 206, return plunger 208, a second o-ring 210 for forming a seal between the interior of lower body portion 130 and return plunger 208, a plunger return spring 212, inlet valve 214, inlet valve return spring 216, cartridge plug 218, and a third o-ring 220 for forming a seal between the interior of lower body portion 130 and cartridge plug 218.

Again with reference to the exemplary embodiment shown in FIGS. 2-5, handle 110 is pivotally attached to upper body portion 120 at pivot point 150. A pivot pin 152 passes through handle 110 and upper body portion 120. A biasing member in the form of a torsion spring 170 is in contact with handle 110 for providing mechanical force that holds handle 110 in a first, closed, or released position (see FIGS. 2 and 4). By pulling handle 110 in an arc away from the first position and moving handle 110 to a second, open, or applied position, the operator causes control valve 100 to change state, thereby allowing pressurized air to be delivered through the valve. More specifically, as handle 110 is pulled through an arc of about, for example, 75°, cam 112 rotates and forces cam follower 200 downward. This downward motion compresses graduating spring 206 and creates a force on return plunger 208 which depresses inlet valve 214 and delivers pressurized air to delivery port 136. As pressure builds in delivery port 136, the pressure acts on return plunger 208 causing it to balance the force of graduating spring 206 until the inlet valve 214 seats against the interior of lower body portion 130. In this situation, inlet valve 214 also seats against plunger 211 and prevents the delivery air from exhausting through the center of plunger 211 so that the desired pressure in the delivery line is maintained. When handle 110 is released or moved to the release position, cam follower 200 rises, the exhaust passage is opened, and pressurized air in the delivery line is exhausted through exhaust port 134. Springs 212 and 216 provide force to return plunger 212 and inlet valve 214 respectively to their closed positions.

Figure 3:
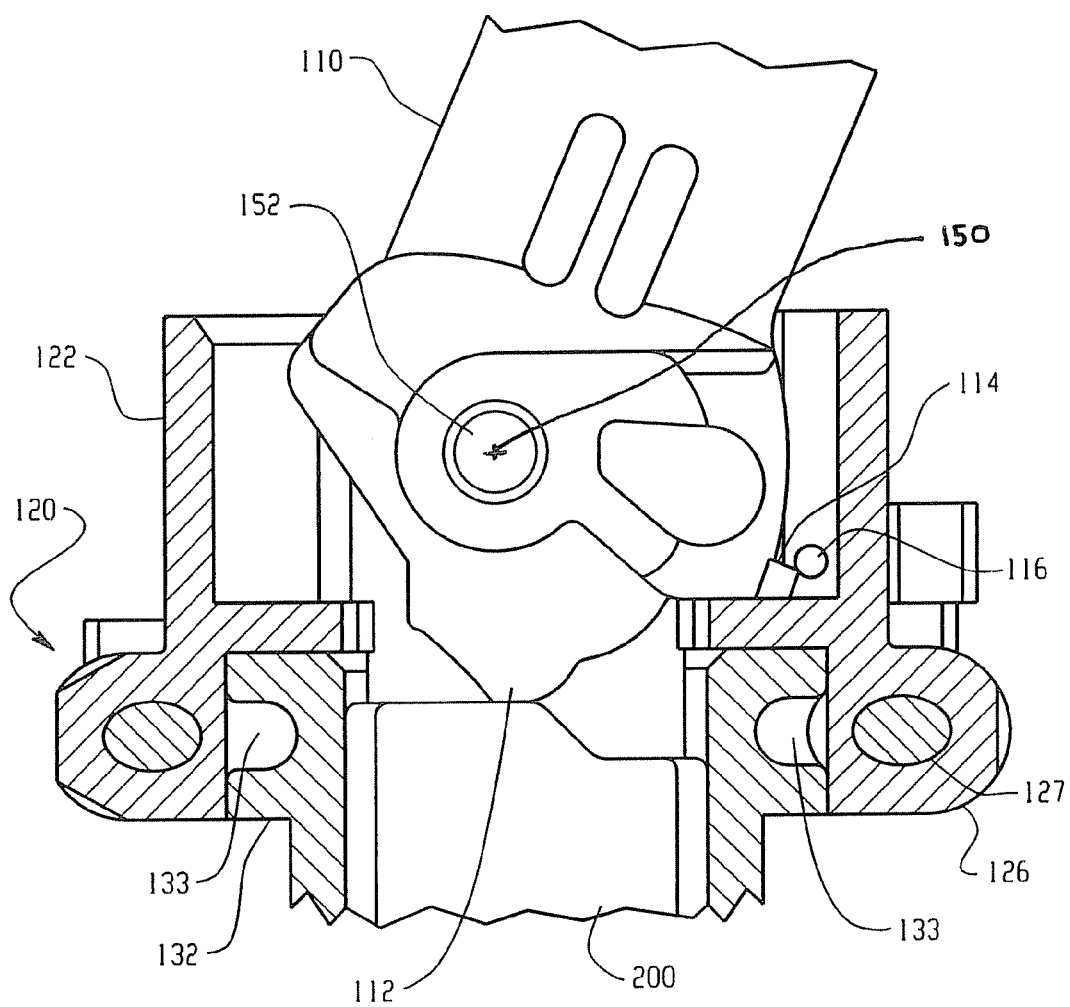
FIG. 3 is a close-up cross-sectional side view of the valve handle and body configuration of the present invention.
Figure 4:
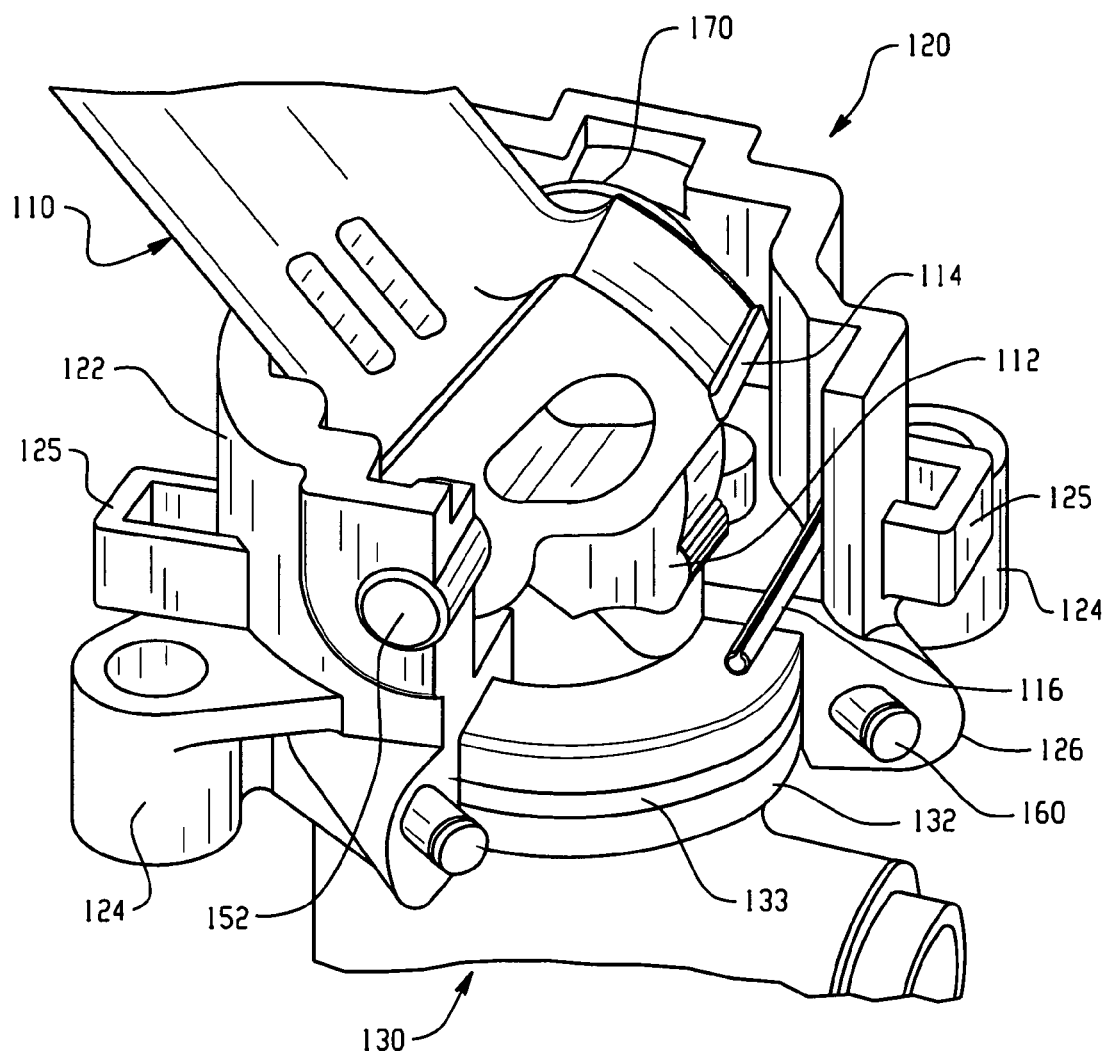
FIG. 4 is a close-up perspective view of the locking mechanism of the present invention showing the valve in the closed or released position.
Figure 5:
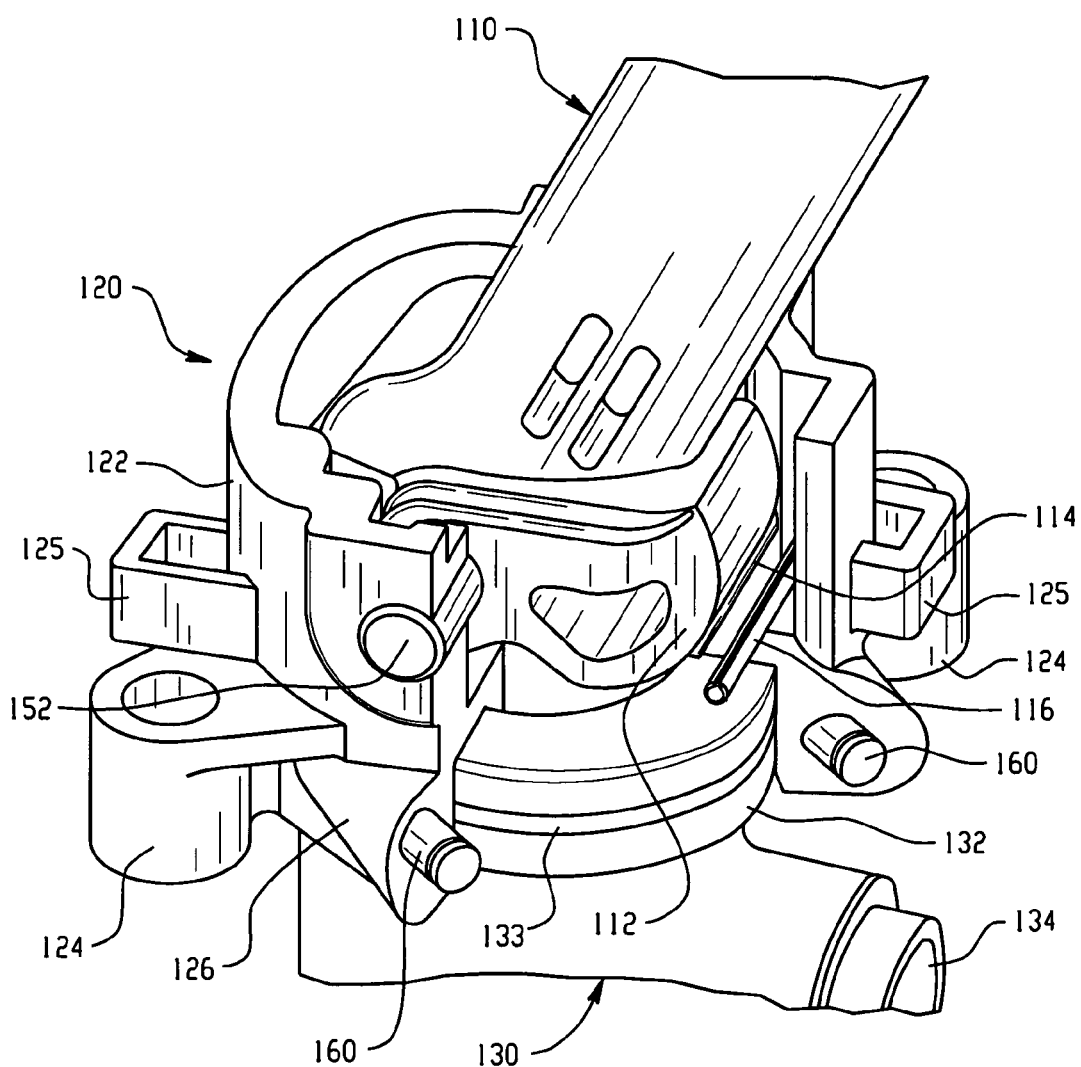
FIG. 5 is a close-up perspective view of the locking mechanism of the present invention showing the valve in the open or applied position.

As best shown in FIGS. 3-5, the exemplary embodiment of the present invention provides a mechanism for locking handle 110 in the second, open, or applied position so that the operator does not have to physically hold the handle in the second position to keep the valve open. In this embodiment, handle-receiving portion 122 has been modified to include a first locking member or roll pin 116 that extends transversely across the width of upper body portion 120. Cam 112, which is formed at or attached to the end of handle 110 that is pivotally attached to handle-receiving portion 122 of upper body portion 120, includes on one side a second locking member in the form of a detent or protrusion 114. When handle 110 is pulled in an arc from the first position to the second position, detent 114 makes contact with and then slips underneath a flexing roll pin 116 (or other flexible member). The geometry of detent 114 (see FIG. 3) allows it to remain engaged with and positioned underneath roll pin 116, thereby overcoming the force of torsion spring 170 and locking handle 110 in the second position. To release 110 from the second position, the operator simply exerts force on handle 110 sufficient to disengage detent 114 from roll pin 116. The handle snaps out of the locked position and torsion spring 170 returns handle 110 to the first position. In some situations, it may be necessary for the operator to pull back slightly on handle 110 to disengage the locking members.

Other embodiments of the present invention are possible. In one alternate embodiment, roll pin 116 is replaced with a locking spring that is inserted or mounted in upper body portion 120. This locking spring provides the force necessary to hold handle 110 in the second position when the locking spring engages detent 114. In another embodiment, detent 114 is replaced with a spring (manufactured from plastic or other material) that is mounted on or formed integrally with cam 112. This spring engages a pin similar to roll pin 116 for holding handle 110 in the second position. In another embodiment, cam 112 includes a plastic internal locking spring as well as detent and roll pin locking members. In still another embodiment, a biasing member holds handle 110 in the second or open position and the first and second locking members cooperate to hold handle 110 in the first or closed position when so desired.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

The invention claimed is:

1. A valve, comprising:
   (a) a valve body, wherein the valve body further comprises a first locking member, and wherein the first locking member further comprises a roll pin mounted in the valve body;
   (b) a handle attached to the valve body, wherein the handle is moveable between a first position and a second position for controlling the operation of the valve, and wherein the handle further comprises a second locking member, and wherein the second locking member further comprises a protrusion formed on a portion of the handle;
   (c) a biasing member attached to the handle, wherein the biasing member provides mechanical force for retaining the handle in the first position; and
   (d) wherein moving the handle from the first position to the second position causes the first locking member and the second locking member to cooperate with one another to overcome the force of the biasing member and retain the handle in the second position;
   (e) wherein the valve is a trailer control valve.

2. The valve of claim 1, wherein the handle further comprises a cam, and wherein the second locking member is attached to or formed integrally with the cam.

3. The valve of claim 1, wherein the biasing member further comprises a torsion spring.

4. A valve, comprising:
   (a) a valve body, wherein the valve body further comprises a first locking member, and wherein the first locking member further comprises a roll pin mounted in the valve body;
   (b) a handle attached to the valve body, wherein the handle is moveable between a first position and a second position for controlling the operation of the valve, and wherein the handle further comprises a second locking member, and wherein the second locking member further comprises a protrusion formed on a portion of the handle;
   (c) a biasing member attached to the handle, wherein the biasing member provides mechanical force for retaining the handle in the first position; and
   (d) wherein moving the handle from the first position to the second position causes the first locking member and the second locking member to cooperate with one another to overcome the force of the biasing member and retain the handle in the second position;
   (e) wherein the valve body further comprises an upper body portion detachably connected to a lower body portion, and wherein the lower body portion further comprises: a cam follower; a graduating spring beneath the cam follower; a washer between the cam follower and the graduating spring; a plunger in contact with the graduating spring; a plunger return spring; an inlet valve in contact with the plunger, and an inlet valve return spring.

5. A valve, comprising:
   (a) a valve body comprising an upper body portion detachably connected to a lower body portion;
   (b) a handle attached to the valve body, wherein the handle is moveable relative to the valve body between a first position and a second position for controlling the operation of the valve;
   (c) a first locking member mounted to the valve body;
   (d) a second locking member attached to the handle; and
   (e) a biasing member attached to the handle; wherein the biasing member biases the handle toward the first position;
   (f) wherein when the handle moves from the first position to the second position, the first locking member and the second locking member engages and the first locking member is flexed by the second locking member allowing the handle to move to the second position.

6. The valve of claim 5 wherein the first locking member is flexible.

7. The valve of claim 6 wherein flexing the first locking member allows the second locking member to move past the first locking member when the handle moves to the second position.

8. The valve of claim 5 wherein the handle further comprises a cam, and wherein the second locking member is attached to or formed integrally with the cam.

9. The valve of claim 5 wherein the second locking member further comprises a protrusion for engaging the first locking member.

10. The valve of claim 5 wherein the first locking member and the second locking member cooperate with one another to overcome the force of the biasing member and retain the handle in the second position.

11. The valve of claim 5 wherein the biasing member comprises a torsion spring.

12. The valve of claim 5 wherein the valve is a trailer control valve.

13. The valve of claim 5 wherein the valve body further comprises: a cam follower; a graduating spring beneath the cam follower; a washer between the cam follower and the graduating spring; a plunger in contact with the graduating spring; a plunger return spring; an inlet valve in contact with the plunger, and an inlet valve return spring.

14. The valve of claim 5 wherein the first locking member comprises a pin.

* * * * *

UNITED STATES PATENT AND TRADEMARK OFFICE
CERTIFICATE OF CORRECTION

PATENT NO. : 7,575,285 B2  Page 1 of 1
APPLICATION NO. : 11/119108
DATED : August 18, 2009
INVENTOR(S) : Bobby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Seventh Day of September, 2010

David J. Kappos
*Director of the United States Patent and Trademark Office*